United States Patent
Hatano

(10) Patent No.: US 12,208,693 B2
(45) Date of Patent: Jan. 28, 2025

(54) POWER SUPPLY SYSTEM AND RELAY STATE DETERMINING METHOD

(71) Applicant: TOYOTA JIDOSHA KABUSHIKI KAISHA, Toyota (JP)

(72) Inventor: Takahiro Hatano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 18/302,413

(22) Filed: Apr. 18, 2023

(65) Prior Publication Data

US 2023/0365013 A1 Nov. 16, 2023

(30) Foreign Application Priority Data

May 12, 2022 (JP) .................................. 2022-079041

(51) Int. Cl.
*B60L 3/00* (2019.01)
*B60L 50/51* (2019.01)
(Continued)

(52) U.S. Cl.
CPC ............. *B60L 3/0023* (2013.01); *B60L 50/51* (2019.02); *H02J 7/345* (2013.01); *B60L 58/20* (2019.02);
(Continued)

(58) Field of Classification Search
CPC ............................................ H02J 2310/46–48
See application file for complete search history.

(56) References Cited

U.S. PATENT DOCUMENTS

2006/0259209 A1* 11/2006 Sugimura .......... G01R 31/3278
    701/1
2010/0084060 A1* 4/2010 Hinshaw ................. C06B 31/00
    149/61
(Continued)

FOREIGN PATENT DOCUMENTS

CN      112012862 A * 12/2020 .............. F02N 11/08
JP      2007232491 A * 9/2007
(Continued)

OTHER PUBLICATIONS

English machine translation of JP2007232491A published Sep. 13, 2007 (Year: 2007).*

(Continued)

*Primary Examiner* — Rexford N Barnie
*Assistant Examiner* — David A Shiao
(74) *Attorney, Agent, or Firm* — Sughrue Mion, PLLC

(57) ABSTRACT

A power supply system includes a power storage device; a power control device with a capacitor configured to be pre-charged with electric power from a power source other than the power storage device; a contact relay configured to electrically connect the power storage device and the power control device and disconnect a connection between the power storage device and the power control device, and a controller that sets a target voltage for a pre-charge of the capacitor in response to a system startup request and outputs a closing command for the contact relay in response to a completion of the pre-charge. The controller sets the target voltage to a value different from a voltage of the power storage device before or after an output of the closing command and determines a state of the contact relay based on a voltage of the capacitor after the output of the closing command.

5 Claims, 5 Drawing Sheets

(51) Int. Cl.
*H02J 7/34* (2006.01)
*B60L 58/20* (2019.01)

(52) U.S. Cl.
CPC ..... *B60L 2240/547* (2013.01); *B60L 2270/20* (2013.01); *H02J 2310/48* (2020.01)

(56) References Cited

U.S. PATENT DOCUMENTS

| | | | | |
|---|---|---|---|---|
| 2010/0296204 | A1* | 11/2010 | Ichikawa | B60L 3/04 361/15 |
| 2015/0046001 | A1* | 2/2015 | Park | B60L 3/0046 701/22 |
| 2015/0321574 | A1* | 11/2015 | Oi | H02M 3/04 307/10.1 |
| 2018/0246169 | A1* | 8/2018 | Miura | B60L 58/10 |
| 2020/0144840 | A1* | 5/2020 | Masuda | B60L 50/16 |
| 2020/0384866 | A1* | 12/2020 | Tagaya | G01R 31/006 |
| 2024/0266849 | A1* | 8/2024 | Matsuda | H02J 7/00 |

FOREIGN PATENT DOCUMENTS

| | | | |
|---|---|---|---|
| JP | 2020120526 A | * | 8/2020 |
| JP | 2021-112000 A | | 8/2021 |
| KR | 20210122347 A | * | 10/2021 |

OTHER PUBLICATIONS

English machine translation of JP2020120526A published Aug. 6, 2020 (Year: 2020).*
English machine translation of CN112012862A published Dec. 1, 2020 (Year: 2020).*
English machine translation of KR20210122347A published Oct. 12, 2021 (Year: 2021).*

* cited by examiner

POWER SUPPLY SYSTEM AND RELAY STATE DETERMINING METHOD

CROSS-REFERENCE TO RELATED APPLICATION

The present disclosure claims priority to Japanese Patent Application No. 2022-79041 filed May 12, 2022, which is incorporated herein by reference in its entirety including specification, drawings and claims.

TECHNICAL FIELD

The present disclosure relates to a power supply system including a relay and a relay state determining method in the power supply system.

BACKGROUND

A conventionally known moving object includes a storage battery, a power supply device that converts DC power from the storage battery into AC power and supplies the AC power to the motor, two contacts to which a charging device that outputs DC power for charging the storage battery is connected, and a charging controller (as described in, for example, Japanese Patent Application Laid Open No. 2021-112000). In the mobile body, the storage battery and the power supply device are electrically connected via two power lines respectively including a system main relay. The storage battery and the two contacts are electrically connected via two charging lines respectively including a charging relay. When charging the storage battery with DC power from a charging device, the charging controller controls the charging device such that a capacitor of the power supply device is pre-charged while the two system main relays are opened prior to charging the storage battery. Further, the charging controller controls the charging device such that the capacitor is pre-charged after opening at least one of the two charging relays so as to open at least one of the two charging lines. When a voltage of the capacitor is equal to or higher than a threshold value, the charging controller determines that the opened charging relay has an abnormality.

SUMMARY

In the moving object described above, contact relays (mechanical relays or hybrid relays) that include movable and fixed contacts are generally employed as system main relays and the like. However, when the ambient environment of the contact relays is humid and below freezing, moisture may freeze between the movable and fixed contacts. If icing occurs in the relay, conduction between the movable and fixed contacts becomes impossible even if the relay is energized. Further, in contact relays, the conduction between the movable and fixed contacts may become impossible due to the bite of foreign matter. If the relay does not close normally due to the icing and the like, electric power may not be supplied from the storage battery and the like to the power supply device, and a failure diagnosis function may incorrectly diagnose that a failure of the power supply device has occurred. Therefore, in order to suppress a misdiagnosis by the failure diagnosis function, it is required to properly determine a state of the contact relays included in the power supply system.

A main object of the present disclosure is to properly determine the status of the contact relay included in the power supply system.

A power supply system of the present disclosure includes a power storage device; a power control device with a capacitor configured to be pre-charged with electric power from a power source other than the power storage device; and a contact relay configured to electrically connect the power storage device and the power control device and disconnect a connection between the power storage device and the power control device. The power supply system further includes a controller programmed to set a target voltage for a pre-charge of the capacitor in response to a system startup request and output a closing command for the contact relay in response to a completion of the pre-charge. The controller is programmed to set the target voltage to a value different from a voltage of the power storage device before or after an output of the closing command and determine a state of the contact relay based on a voltage of the capacitor after the output of the closing command.

A relay state determining method of the present disclosure is applied in a power supply system including a power storage device; a power control device that includes a capacitor configured to be pre-charged with electric power from a power source other than the power storage device; and a contact relay configured to electrically connect the power storage device and the power control device and disconnect a connection between the power storage device and the power control device. The method includes: setting a target voltage for a pre-charge of the capacitor in response to a system startup request and outputting a closing command for the contact relay in response to a completion of the pre-charge; setting the target voltage to a value different from a voltage of the power storage device, before or after an output of the closing command; and determining a state of the contact relay based on a voltage of the capacitor after the output of the closing command.

DESCRIPTION OF EMBODIMENTS

The following describes some aspects of the present disclosure with reference to drawings.

Figure 1:
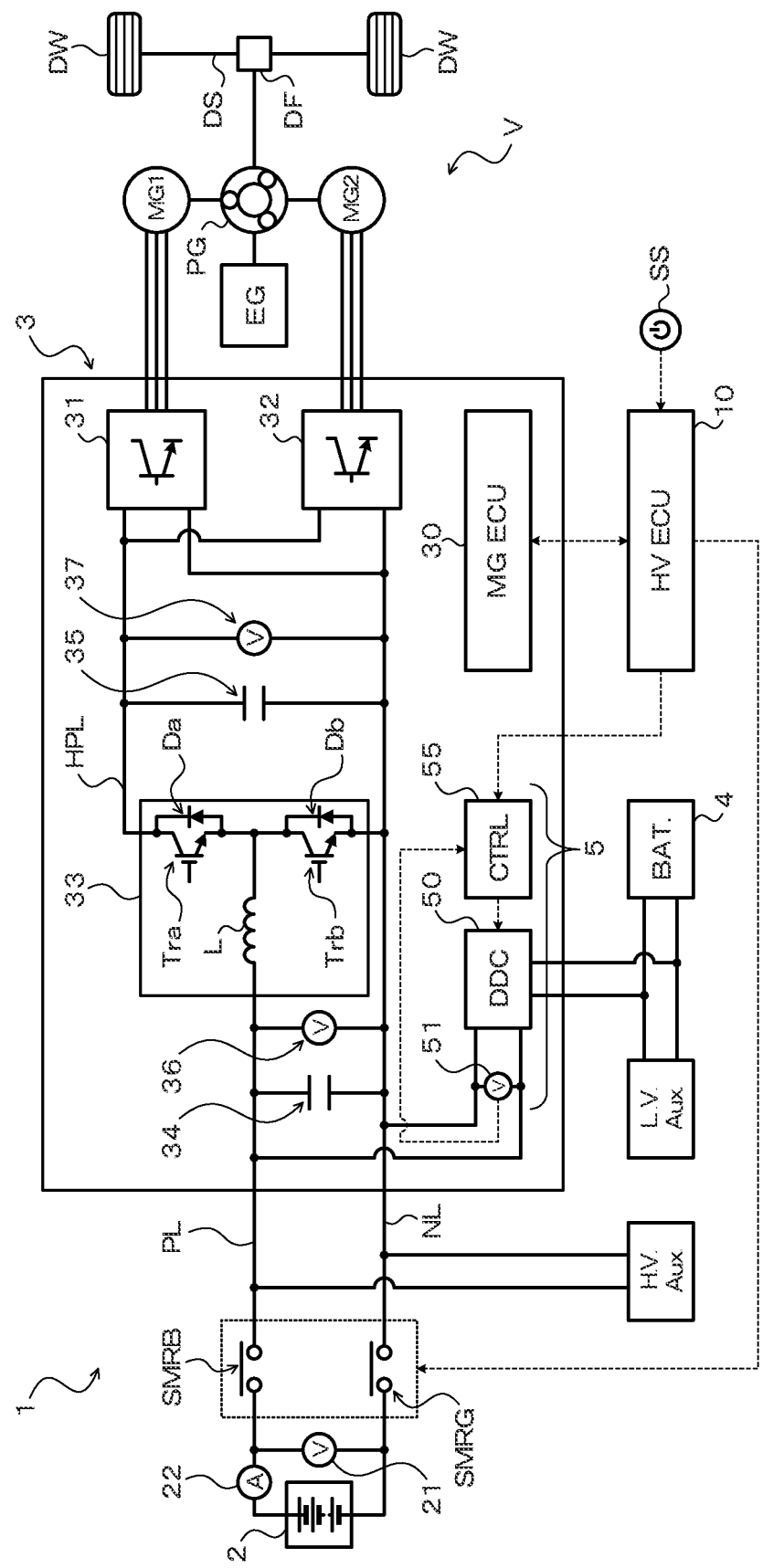
FIG. 1 is a schematic configuration diagram illustrating a vehicle including a power supply system of the present disclosure.

FIG. 1 is a schematic configuration diagram illustrating a hybrid electric vehicle V as a vehicle including a power supply system 1 of the present disclosure. In addition to the power supply system 1, the hybrid electric vehicle V illustrated in FIG. 1 includes an engine EG, a single pinion type planetary gear PG, motor generators MG1 and MG2 that exchange electric power with the power supply system 1, and a hybrid electronic control unit (hereinafter referred to as "HVECU") that controls the entire hybrid electric vehicle V. Further, the power supply system 1 includes a high voltage battery (power storage device) 2, a power control unit (hereinafter referred to as "PCU") 3 that exchanges electric power with the high voltage battery 2 to drive the motor generators MG1 and MG2, a positive electrode side system main relay SMRB (hereinafter referred to as "positive electrode side relay SMRB"), a negative electrode side system main relay SMRG (hereinafter referred to as "negative electrode side relay SMRG"), a low voltage battery (second power storage device) 4 with a lower voltage than the high voltage battery 2, and a bidirectional DC/DC converter (voltage converter) 5.

The engine EG is an internal combustion engine that generates power by explosive combustion of a mixture of air and hydrocarbon fuels such as gasoline, light oil, LPG and the like. The engine EG is controlled by an engine electronic control unit (not shown). The planetary gear PG includes a sun gear connected to the motor generator MG1 (rotor), a ring gear connected to both an output shaft and the motor generator MG2 (rotor), a planetary carrier that rotatably supports a plurality of pinion gears and is connected to a crankshaft of the engine EG. The output shaft is connected to the left and right drive wheels DW via a differential gear DF and drive shafts DS.

The motor generators MG1 and MG2 are both synchronous generator motors (three-phase AC motors). The motor generator MG1 is mainly driven by the engine EG under load operation so as to operate as a generator that generates electric power. The motor generator MG2 is mainly driven by the electric power from at least one of the high voltage battery 2 and the motor generator MG1. The motor generator MG2 also outputs regenerative braking torque when braking the hybrid electric vehicle V. The motor generators MG1 and MG2 can exchange electric power with the high voltage battery 2 via the PCU 3 and also exchange electric power with each other via the PCU 3.

The HVECU 10 includes a microcomputer with CPU, ROM, RAM, an input/output interface and the like, various drive circuits, various logic ICs, and the like (not shown). The HVECU 10 is connected to an engine electronic control unit and the like via communication lines such as CAN. Further, Various sensors such as a start switch SS, an accelerator pedal position sensor, a shift position sensor, a vehicle speed sensor and the like are connected to the HVECU 10. When the hybrid electric vehicle V is driven, the HVECU 10 sets required torque for driving based on an accelerator opening degree and the vehicle speed. Further, the HVECU 10 sets a required power and a target rotation speed for the engine EG, torque command values for the motor generators MG1 and MG2, and the like.

The high voltage battery 2 of the power supply system 1 is, for example, a lithium ion secondary battery or a nickel hydrogen secondary battery with a rated output voltage of 200V to 400V. A positive electrode side power line PL is connected to a positive electrode terminal of the high voltage battery 2 via the positive electrode side relay SMRB. A negative electrode side power line NL is connected to a negative electrode terminal of the high voltage battery 2 via the negative electrode side relay SMRG. The high voltage battery 2 includes a voltage sensor 21 for detecting a terminal voltage VB of the high voltage battery 2 and a current sensor 22 for detecting a current (charge/discharge current) IB flowing through the high voltage battery 2. The terminal voltage VB of the high voltage battery 2 detected by the voltage sensor 21 and the current IB detected by the current sensor 22 are sent to the HVECU 10 directly via signal lines (not shown) or by a power supply management electronic control unit (not shown) that manages the high voltage battery 2.

The positive electrode side relay SMRB and the negative electrode side relay SMRG are both contact relays (mechanical relays) respectively including a coil, a movable contact and a fixed contact (not shown). The positive electrode side relay SMRB and the negative electrode side relay SMRG are normally open relays that are closed when an exciting current is supplied to the coil. In the present embodiment, the positive electrode side relays SMRB and the negative electrode side SMRG are controlled to open and close by the HVECU 10. That is, when the start switch SS is turned on by a driver and the system of the hybrid electric vehicle V is requested to be started, the HVECU 10 outputs closing commands for both relays SMRB and SMRG so as to supply exciting current to the coils of the positive electrode side relays SMRB and the negative electrode side SMRG. When each coil is excited and the positive electrode side relays SMRB and the negative electrode side SMRG are normally closed (when the movable contact and the fixed contact come into contact with each other), the high voltage battery 2 and the PCU 3 are electrically connected.

When the start switch SS is turned off by the driver and the system of the hybrid electric vehicle V is requested to be stopped, the HVECU 10 outputs open commands for the positive electrode side relay SMRB and the negative electrode side relay SMRG so as to cut off a supply of the exciting current to both relays SMRB and SMRG. As a result, when an excitation of each coil is released and the positive electrode side relay SMRB and the negative electrode side relay SMRG are opened (when the movable contact and the fixed contact are separated), an electrical connection between the high voltage battery 2 and the PCU 3 is released. The positive electrode side relay SMRB and the negative electrode side relay SMRG may be contact-type hybrid relays with no coil.

The PCU 3 of the power supply system 1 includes a first inverter 31, a second inverter 32, a buck-boost converter (voltage converter) 33, and a motor electric control unit (hereinafter referred to as "MGECU") 30 that controls the first and second inverters 31, 32 and the buck-boost converter 33. The first inverter 31 drives the motor generator MG1 and the second inverter 32 drives the motor generator MG2. The buck-boost converter 33 can boost the electric power from the high voltage battery 2 and drop voltage from the motor generators MG1 and MG2.

The first and second inverters 31 and 32 include six transistors (for example, insulated gate bipolar transistors (IGBTs), not shown), and six diodes (not shown) connected in parallel to each transistor in an opposite direction. The six transistors are arranged in pairs, such that two transistors in each pair respectively serve as a source and a sink relative to a high voltage power line HPL and the negative electrode side power line NL. Each phase of three-phase coils (U phase, V phase and W phase coils) of the motor generators MG1 and MG2 is connected to each of connection points between the paired transistors. The buck-boost converter 33 includes two transistors (for example, insulated gate bipolar transistors) Tra and Trb, two diodes Da and Db connected in parallel to each of the transistors Tra and Trb in an opposite direction, and a reactor L. One end of the reactor L is electrically connected to the positive electrode side power line PL. The other end of the reactor L is electrically connected to an emitter of one transistor (upper arm element) Tra and a collector of the other transistor (lower arm element) Trb. Further, a collector of the one transistor Tra is electrically connected to the high voltage power line HPL. An emitter of the other transistor Trb is electrically connected to the negative electrode side power line NL.

Further, the PCU 3 includes a filter capacitor (first capacitor) 34, a smoothing capacitor (second capacitor) 35, and voltage sensors 36 and 37. A positive electrode terminal of the filter capacitor 34 is electrically connected to the positive electrode side power line PL (one end of the reactor L) between the positive electrode side relay SMRB and the buck-boost converter 33. A negative electrode terminal of the filter capacitor 34 is electrically connected to the negative electrode side power line NL between the negative electrode side relay SMRG and the buck-boost converter 33. Thus, the filter capacitor 34 smoothes the voltage on the high voltage battery 2 side of the buck-boost converter 33. Further, the voltage sensor 36 detects a terminal voltage (voltage before boosting) VL of the filter capacitor 34.

A positive electrode terminal of the smoothing capacitor 35 is electrically connected to the high voltage power line HPL (the collector of the transistor Tra of the buck-boost converter 33) between the buck-boost converter 33 and the first and second inverters 31 and 32. A negative electrode terminal of the smoothing capacitor 35 is electrically connected between the buck-boost converter 33 and the first and second inverters 31 and 32 to the negative electrode side power line NL and the emitter of the transistor Trb of the buck-boost converter 33. Thus, the smoothing capacitor 35 smoothes the voltage on the motor generators MG1 and MG2 side of the buck-boost converter 33. Further, the voltage sensor 37 detects a terminal voltage (voltage after boosting) VH of the smoothing capacitor 35. The terminal voltage VL of the filter capacitor 34 detected by the voltage sensor 36 and the terminal voltage VH of the smoothing capacitor 35 detected by the voltage sensor 37 are sent to the MGECU 30 and sent to the HVECU 10 directly or by the MGECU 30 via signal lines (not shown).

The MGECU 30 includes a microcomputer with CPU, ROM, RAM, an input/output interface and the like, various drive circuits, various logic ICs, and the like (not shown). The MGECU 30 is connected to the HVECU 10 and the like via communication lines such as CAN. The MGECU 30 acquires command signals from HVECU 10, a detection value of a resolver (not shown) that detects a rotational position of the rotor of the motor generator MG1, a detection value of a resolver (not shown) that detects a rotational position of the rotor of the motor generator MG2, a current value from a current sensor (not shown) of the buck-boost converter 33, the terminal voltages VL, VH from voltage sensors 36, 37, phase currents applied to the motor generators MG1 and MG2 detected by current sensors (not shown) and the like. The MGECU 30 generates gate signals (switching control signals) to the first and second inverters 31, 32 and the buck-boost converter 33 based on these signals and the like so as to switch and control them.

The low voltage battery 4 of the power supply system 1 is a lead storage battery with a rated output voltage of, for example, about 12V. The low voltage battery 4 is connected to a plurality of auxiliary equipment (low voltage auxiliary equipment) via a low voltage power line. The bidirectional DC/DC converter (DDC) 5 is connected to the positive electrode side power line PL between the positive electrode side relay SMRB and PCU 3, and is connected to the negative electrode side power line NL between the negative electrode side relay SMRG and PCU 3. Further, the bidirectional DC/DC converter 5 is connected to the low voltage battery 4 and the auxiliary equipment via the low voltage power line. In addition to the bidirectional DC/DC converter 5, high voltage auxiliary devices such as a compressor (inverter compressor) of an air conditioner and a converter to AC100V are connected to the positive electrode side power line PL and the negative electrode side power line NL.

The bidirectional DC/DC converter 5 of the power supply system 1 drops electric power from the positive electrode side power line PL (the high voltage battery 2 and/or the PCU 3 (boost voltage converter 33)) so as to supply the dropped electric power to the low voltage power line (the low voltage battery 4 and/or the auxiliary equipment). Further, the bidirectional DC/DC converter 5 boosts electric power from the low voltage battery 4 so as to supply the boosted electric power to the positive electrode side power line PL (the high voltage battery 2 and/or the PCU 3). In the present embodiment, the bidirectional DC/DC converter 5 includes a voltage conversion circuit 50, a voltage sensor 51, and a control circuit 55. The voltage sensor 51 detects a voltage on the high voltage battery 2 and the PCU 3 side of the voltage conversion circuit 50. The control circuit 55 feedback-controls the voltage conversion circuit 50 such that a detected value of the voltage sensor 51 becomes a required value. Further, the bidirectional DC/DC converter includes a voltage sensor (not shown) that detects a voltage on the low voltage battery 4 side of the voltage conversion circuit 50.

In the present embodiment, when the start switch SS is turned on by the driver and the system of the hybrid electric vehicle V is requested to be started, the bidirectional DC/DC converter 5 (voltage conversion circuit 50) boosts electric power from the low voltage battery 4 or a power source and supplies the boosted electric power to the PCU 3 before closing the positive electrode side relay SMRB and the negative electrode side relay SMRG. That is, the HVECU 10 sends a target voltage Vtag that is a required value of a voltage output from the voltage conversion circuit 50 to the control circuit 55 in response to the system startup request. Further, the control circuit 55 feedback-controls the voltage conversion circuit 50 such that the detected value of the voltage sensor 51 becomes a target value. Thus, the filter capacitor 34 and the smoothing capacitor 35 of the PCU 3 can be pre-charged (recharged) prior to closing the positive electrode side relay SMRB and the negative electrode side relay SMRG. As a result, when the positive electrode side relay SMRB and the negative electrode side relay SMRG are closed, it is possible to suppress a large inrush current from flowing to the positive electrode side power line PL, the PCU 3 or the like.

Figure 2:
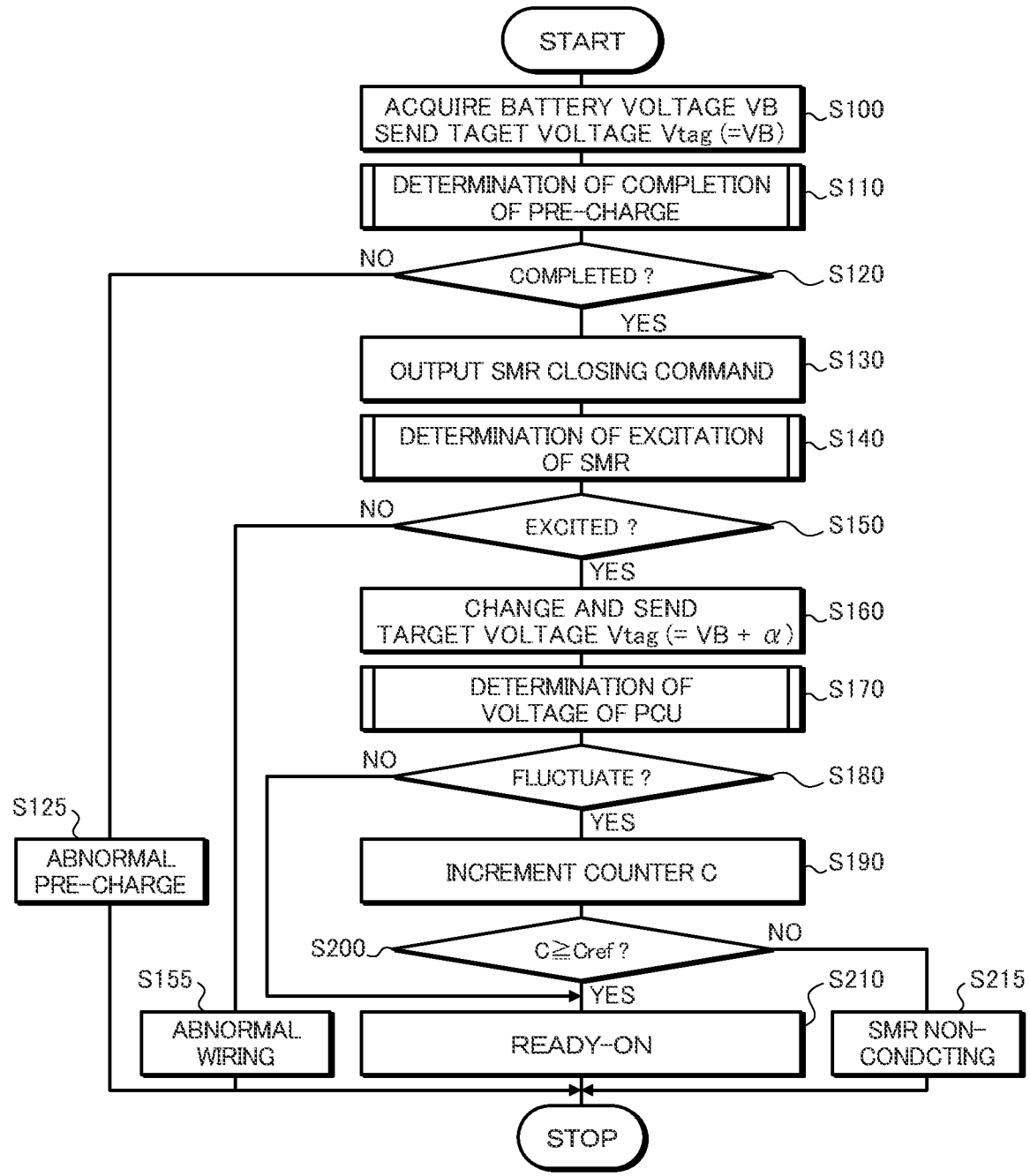
FIG. 2 is a flowchart showing one example of a routine executed by a controller of the power supply system of the present disclosure.
Figure 3:
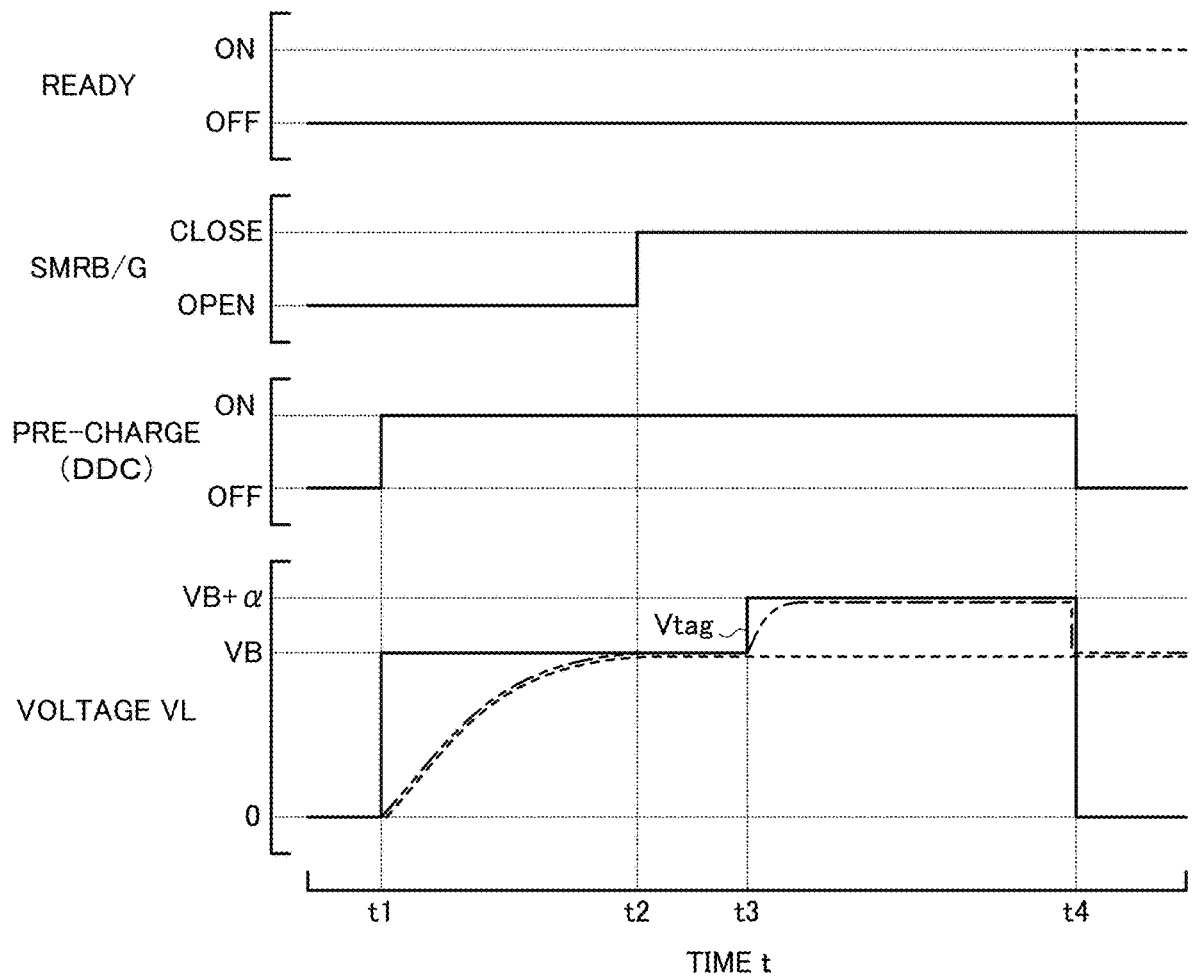
FIG. 3 is a time chart showing time changes in a target voltage for a pre-charge, a voltage of a capacitor of a power control device and the like when the routines of FIG. 2 is performed.

Subsequently, a control procedure of the power supply system 1 when the start switch SS is turned on by the driver to start the system of the hybrid electric vehicle V will be described with reference to FIGS. 2 and 3. FIG. 2 is a flowchart showing one example of a routine executed by the HVECU 10 when the start switch SS is turned on and the system of the hybrid electric vehicle V is requested to be started. Further, FIG. 3 is a time chart illustrating time changes in the target voltage Vtag, the terminal voltage VL between terminals of the filter capacitor 34 of the PCU 3 and the like when the routines of FIG. 2 is performed.

As shown in FIG. 2, when the start switch SS is turned on by the driver (time t1 in FIG. 3), the HVECU 10 (CPU) acquires the terminal voltage VB of the high voltage battery 2 detected by the voltage sensor 21 (step S100). Further, in step S100, the HVECU 10 sets the acquired terminal voltage VB to the target voltage Vtag of the filter capacitor 34 and the smoothing capacitor 35 of the PCU 3 (the target voltage Vtag of the pre-charge) and sends the set target voltage Vtag to the control circuit 55 of the bidirectional DC/DC converter 5. The control circuit 55 receives the target voltage Vtag from the HVECU 10 and starts feedback control of the voltage conversion circuit 50 while the positive electrode side relay SMRB and the negative electrode side relay SMRG are opened, such that the detection value of the voltage sensor 51 becomes the target voltage Vtag. Further, when the detected value of the voltage sensor 51 reaches the target voltage Vtag, the control circuit 55 feedback-controls the voltage conversion circuit 50 such that the detected value is maintained at the target voltage Vtag.

After sending the target voltage Vtag to the control circuit 55 of the bidirectional DC/DC converter 5, the HVECU 10 acquires the terminal voltage VB of the high voltage battery 2 detected by the voltage sensor 21 and the terminal voltage VL of the filter capacitor 34 detected by the voltage sensor 36. Further, the HVECU 10 determines whether or not the pre-charge of the filter capacitor 34 and the like is normally completed based on an absolute value |VB−VL| of a difference between the terminal voltage VB and the terminal voltage VL (step S110). In step S110, the HVECU determines whether or not a state in which the absolute value |VB−VL| of the difference is equal to or less than the predetermined threshold value ΔV0 has continued for a predetermined time tref0, for example. The threshold value ΔV0 used in step S110 is a relatively small positive value (for example, about 30V).

When the state in which the absolute value |VB−VL| is equal to or less than the threshold value ΔV0 does not continue for a predetermined time tref0, or when |VB−VL| exceeds the threshold value ΔV0 even though a predetermined time has elapsed after sending the target voltage Vtag, the HVECU 10 determines that the pre-charge of the filter capacitor 34 and the like with the bidirectional DC/DC converter 5 is not normally completed due to an abnormality or disconnection of the voltage conversion circuit 50 or the control circuit 55 (step S120: NO). In this case, the HVECU 10 sends a pre-charge stop command to the control circuit 55 and turns on a predetermined warning light on an instrument panel and the like (not shown) (step S125). Further, in step S125, the HVECU 10 prohibits an operation of the power supply system 1, a transition to the READY-ON state (driving permission state) in which the hybrid electric vehicle V is permitted to drive, and an operation of the bidirectional DC/DC converter 5. Then, the HVECU 10 terminates the routine of FIG. 2.

When the HVECU 10 determines the pre-charge of the filter capacitor 34 and the like with the bidirectional DC/DC converter 5 has been successfully completed (step S120: YES), the HVECU 10 outputs a closing command for the positive pole side relay SMRB and the negative pole side relay SMRG such that the exciting current is supplied to the coil of the both relays SMRB and SMRG (step S130, time t2 in FIG. 3). Further, HVECU 10 acquires detected voltages of two voltage sensors (not shown) that respectively detect voltages applied to the coils of the positive pole side relay SMRB or the negative pole side relay SMRG, and determines whether the coils of both relays SMRB and SMRG are excited (whether voltage is applied) based on the acquired detected voltages (step S140).

When at least one of the detected voltages of the above two voltage sensors is less than a predetermined voltage threshold, the HVECU 10 determines that at least one of the coils of the positive electrode side relay SMRB and the negative electrode side relay SMRG is not normally excited due to an abnormality in a connection in the positive electrode side relay SMRB and the negative electrode side relay SMRG (step S150: NO). In this case, the HVECU 10 sends the pre-charge stop command to the control circuit 55 and turns on the predetermined warning light on the instrument panel and the like (not shown) (step S155). Further, in step S155, the HVECU 10 prohibits the transition to the READY-ON state. Then, the HVECU 10 terminates the routine of FIG. 2.

On the other hand, when the detected voltages of the above two voltage sensors are equal to or more than the predetermined voltage threshold, the HVECU 10 determines that the coils of both of the positive electrode side relay SMRB and the negative electrode side relay SMRG are normally excited (step S150: YES). In this case, the HVECU 10 sets the target voltage Vtag of the pre-charge to a value different from the value set in step S100 (terminal voltage VB) and sends the set target voltage Vtag to the control circuit 55 of the bidirectional DC/DC converter 5 (step S160, time t3 in FIG. 3). In step S160, the HVECU 10 acquires the terminal voltage VB of the high voltage battery 2 detected by the voltage sensor 21 and sets a sum of the acquired terminal voltage VB and a predetermined value α (for example, about 5V) to the target voltage Vtag of the pre-charge. The control circuit 55 receives the target voltage Vtag from the HVECU 10 and feedback-controls the voltage conversion circuit 50 such that the detected value of the voltage sensor 51 becomes the received new target voltage Vtag.

After the process of step S160, the HVECU 10 acquires the terminal voltage VL of the filter capacitor 34 detected by the voltage sensor 36 and determines whether or not the terminal voltage VL fluctuates (follows) in accordance with a change in the target voltage Vtag (step S170). In step S170, the HVECU 10 determines whether or not a state in which an absolute value |Vtag-VL| of a difference between the target voltage Vtag sent in step S160 and the terminal voltage VL of the filter capacitor 34 is equal to or less than the predetermined threshold value ΔV1 that is a relatively small has continued for a predetermined time tref1, for example.

Here, if both the positive pole side relay SMRB and negative pole side relay SMRG are normally closed in response to the closing command from HVECU 10 after a completion of pre-charge, the terminal voltage VL of the filter capacitor 34 after the output of the closing command becomes substantially the same as the terminal voltage VB of the high voltage battery 2, as shown by the dashed line in FIG. 3 even if the target voltage Vtag of the pre-charge is different from the terminal voltage VB of the high voltage battery 2. That is, an increase amount (value a) of the target voltage Vtag set in step S160 with respect to the terminal voltage of the high voltage battery 2 is not provided for charging the filter capacitor 34 but for charging the high voltage battery 2.

Therefore, when the state in which the absolute value |Vtag-VL| of the difference is equal to or less than the threshold value ΔV1 does not continue for the time tref1 after the target voltage Vtag is changed in step S160, the HVECU 10 determines that the terminal voltage VL of the filter capacitor 34 becomes substantially the same as the terminal voltage VB of the high voltage battery 2 and that both the positive electrode side relay SMRB and the negative electrode side relay SMRG are normally closed (step S180: NO). Then, the HVECU 10 sends the pre-charge stop command to the control circuit 55 and also permits the hybrid electric vehicle V to shift to the above READY-ON state (step S210, time t4 in FIG. 3), and terminates the routine shown in FIG. 2. Thus, the hybrid electric vehicle V is allowed to drive on the condition that another predetermined READY-ON permission conditions are satisfied.

In contrast, when icing occurs in at least one of the positive pole side relay SMRB and the negative pole side relay SMRG, or when foreign matter is present between the movable and fixed contacts, at least one of the positive pole side relay SMRB and the negative pole side relay SMRG is not normally closed even if the closing command is output from the HVECU 10 after the completion of the pre-charge. In such a case, since the high voltage battery 2 and PCU 3 are not electrically connected to each other, the terminal voltage VL of the filter capacitor 34 after the output of the closing command follows the target voltage Vtag (=VB+α), which is different from the terminal voltage VB of the high voltage battery 2 as shown in FIG. 3 by the double-dotted line.

Therefore, when the state in which the absolute value |Vtag-VL| of the difference is equal to or less than the threshold value ΔV1 has continued for the time tref1 after the target voltage Vtag is changed in step S160, the HVECU 10 determines that the terminal voltage VL of the filter capacitor 34 fluctuates following the changed target voltage Vtag and that both the positive electrode side relay SMRB and the negative electrode side relay SMRG are not normally closed (step S180: YES, time t4 in FIG. 3). In this case, HVECU 10 increments a counter C that indicates the number of times determined that both positive-side relay SMRB and negative-side relay SMRG are not normally closed (step S190) and determines whether the counter C is equal to or more than a predetermined threshold value Cref (step S200). The threshold value Cref used in step S200 is "2" or higher integer (e.g., 3 to 5 times).

When the HVECU 10 determines that the counter C is less than the threshold value Cref (step S200: NO), the HVECU sends the pre-charge stop command to the control circuit 55 and also prohibits the hybrid electric vehicle V to shift to the above READY-ON state, that is, prohibits the power supply system 1 to be operated (step S215, time t4 in FIG. 3), and terminates the routine shown in FIG. 2. Thus, after the process of step S215 is executed, the hybrid electric vehicle V enters a system-off state, and the driver of the hybrid electric vehicle V may turn on the start switch SS again such that the routine of FIG. 2 is executed. When the HVECU 10 determines that the counter C is equal to or more than the threshold value Cref after the routine of FIG. 2 has been executed multiple times (step S200: YES), the HVECU sends the pre-charge stop command to the control circuit 55 and also permits the hybrid electric vehicle V to shift to the above READY-ON state (step S210), and terminates the routine shown in FIG. 2. In step S215, a message may be displayed on a display on an instrument panel (not shown) and the like so as to prompt the user to re-operate the start switch SS.

As described above, the HVECU 10 or the controller of the power supply system 1 sets the target voltage Vtag of pre-charge of the filter capacitor 34 and the like included in the PCU 3 in response to the system startup request via the start switch SS (step S100). Further, the HVECU 10 outputs the closing command of the positive electrode side relay SMRB and the negative electrode side relay SMRG so as to electrically connect the high voltage battery 2 and the PCU 3 in response to the completion of the pre-charge (steps S110-S130 in FIG. 2). Furthermore, the HVECU 10 sets the value (VB+α) different from the terminal voltage VB of the high voltage battery 2 to the target voltage Vtag after the output of the closing command (step S160), and determines whether both the positive electrode side relay SMRB and the negative electrode side relay SMRG are normally closed or not (the states of the relays SMRB and SMRG) based on the terminal voltage VL of the filter capacitor 34 after the output of the closing command (steps S170 and S180).

That is, when the positive electrode side relay SMRB and the negative electrode side relay SMRG are normally closed in response to the closing command by the HVECU 10 after the completion of the pre-charge, the terminal voltage VL of the filter capacitor 34 and the like after the output of the closing command becomes substantially the same as the terminal voltage VB of the high voltage battery 2, even if the target voltage Vtag of the pre-charge and the terminal voltage VB of the high voltage battery 2 are different from each other. On the other hand, when the positive electrode side relay SMRB and the negative electrode side relay SMRG are not normally closed due to icing and the like even though the closing command is output by the HVECU 10 after the pre-charge is completed, the terminal voltage VL of the filter capacitor 34 and the like after the output of the closing command follows the target voltage Vtag (=VB+α) that is different from the terminal voltage VB of the high voltage battery 2. Accordingly, the power supply system 1 can accurately determine whether the positive electrode side relay SMRB and the negative electrode side relay SMRG are normally closed or not from a state of a voltage fluctuation of the filter capacitor 34 after the output of the closing command for the relay SMRB and SMRG, thereby properly determining the status of the positive electrode side relay SMRB and the negative electrode side relay SMRG included in the power supply system 1.

The HVECU 10 determines that the positive electrode side relay SMRB and the negative electrode side relay SMRG are not normally closed and prohibits the hybrid electric vehicle V to shift to the above READY-ON state, that is the power supply system 1 and main functions of the hybrid electric vehicle V to operate (steps S190, S200, S215) when the terminal voltage VL of the filter capacitor 34 fluctuates following the target voltage Vtag after the output of the closing command (step S180: YES). On the other hand, the HVECU 10 determines that the positive electrode side relay SMRB and the negative electrode side relay SMRG are normally closed and permits the hybrid electric vehicle V to shift to the READY-ON state (step S210) when the terminal voltage VL of the filter capacitor 34 does not follow the target voltage Vtag after the output of the closing command (step S180: No). That is, when the positive electrode side relay SMRB and the negative electrode side relay SMRG are not normally closed due to the icing and the like, the hybrid electric vehicle V is prohibited to shift to the READY-ON state. This suppresses a failure diagnosis function of the hybrid electric vehicle V to misdiagnose that the power supply system 1 including the PCU 3 and the like fails.

Further, the HVECU 10 prohibits the hybrid electric vehicle V to be shifted to the READY-ON state (driving permission state) in step S215 when the HVECU 10 determines that the positive electrode side relay SMRB and the negative electrode side relay SMRG are not normally closed after the output of the closing command (S180: YES) and the counter C indicating the number of times determined that the relays SMRB and SMRG are not normally closed is less than the threshold value (predetermined number) Cref equal to or more than 2 (S200: NO). Furthermore, the HVECU 10 permits the hybrid electric vehicle V to be shifted to the READY-ON state (step S210) when the HVECU 10 determines that the positive electrode side relay SMRB and the negative electrode side relay SMRG are normally closed (S180: NO), and when the HVECU determines that the relays SMRB and SMRG are not normally closed after the output of the closing command (S180: YES) and the counter C is equal to or more than the threshold value Cref (S200: YES).

That is, when the icing occurs in at least one of the positive pole side relay SMRB and the negative pole side relay SMRG, multiple excitation of the coils of both relays SMRB and SMRG may break up and remove the ice between the movable and fixed contacts. Therefore, the hybrid electric vehicle V is permitted to be shifted to the READY-ON state on condition that the counter C is equal to or more than the threshold value Clef. This enables the hybrid electric vehicle V to be shifted to the READY-ON state after breaking up and removing the ice by multiple closures of both the relays SMRB and SMRG even if the icing occurs in at least one of the positive electrode side relay SMRB and the negative electrode side relay SMRG. In addition, when the counter C is equal to or more than the threshold value Cref, the hybrid electric vehicle V is shifted to the READY-ON state to allow an execution of a failure diagnosis. This enables to diagnose causes of the positive electrode side relay SMRB and the negative electrode side relay SMRG not being closed normally.

Further, the HVECU 10 acquires the terminal voltage VB of the high voltage battery 2 and sets the acquired terminal voltage VB to the target voltage Vtag in response to the system startup request via the start switch SS (S100). Furthermore, the HVECU 10 confirms that the coils of the positive pole side relay SMRB and the negative pole side relay SMRG are excited after the output of the closing command, and changes the target voltage Vtag to the value (VB+α) different from the terminal voltage VB of the high voltage battery 2 acquired again (steps S130-S160). Then, the HVECU 10 determines whether the terminal voltage VL of the filter capacitor 34 fluctuates following the changed target voltage Vtag (steps S170, S180). This enables to properly determine the state of the positive electrode side relay SMRB and the negative electrode side relay SMRG while properly pre-charging the filter capacitor 34 and the like of the PCU 3.

In step S160 of FIG. 2, since the terminal voltage VB of the high voltage battery 2 is considered to remain substantially unchanged for a while after the system startup request is made, the sum of the target voltage Vtag set in step S100 and the value α may be set as the new target voltage Vtag. Further, in step S160, either the terminal voltage VB of the high voltage battery 2 or a value obtained by subtracting the value a from the target voltage Vtag set in step S100 may be set to the target voltage Vtag. Furthermore, the process of step S170 may determine that both the positive electrode side relay SMRB and the negative electrode side relay SMRG are normally closed when the state in which the absolute value |VB−VL| of the difference between the terminal voltage VB of the high voltage battery 2 and the terminal voltage VL of the filter capacitor 34 is equal to or less than a predetermined threshold value has continued for a predetermined time. Further, the process of step S170 may determine whether or not both the terminal voltage VL of the filter capacitor 34 and the terminal voltage VH of the smoothing capacitor 35 fluctuate following the target voltage Vtag. The process of step S170 may determine whether or not the terminal voltage VH of the smoothing capacitor 35 fluctuates following the target voltage Vtag.

In the power supply system 1, the filter capacitor 34 and the like are pre-charged by the electric power from the bidirectional DC/DC converter 5 that boosts the electric power from the low voltage battery 4 to the target voltage Vtag in response to the system startup request. However, the filter capacitor 34 and the like may be pre-charged by electric power from a power source other than the low voltage battery 4 and the bidirectional DC/DC converter 5. That is, when the high voltage battery 2 of the power supply system 1 can be charged by electric power from an external charging device such as a charger connected to a household power source or a quick charger installed on a stand, the filter capacitor 34 and the like may be pre-charged with the electric power from the external charging device adjusted to reach the target voltage Vtag. In such a case, the power supply system 1 may include a power receiving connector to which the external charging device is connected. The power receiving connector may be connected to the positive electrode side power line PL between the positive electrode side relay SMRB and the PCU 3 via a positive electrode side charging relay (not shown) and may be connected to the negative electrode side power line NL between the negative electrode side relay SMRG and PCU 3 via a negative electrode side charging relay (not shown).

The vehicle including the power supply system 1 described above is not limited to the two-motor type (series parallel type) hybrid electric vehicle V with the planetary gear PG for power distribution. That is, the vehicle on which the power supply system 1 is mounted may be a one-motor type hybrid electric vehicle, a series type hybrid electric vehicle, a parallel type hybrid electric vehicle, a plug-in hybrid electric vehicle (PHEV) or a battery electric vehicle (BEV). Further, the PCU 3 may include two or more buck-boost converters.

Figure 4:
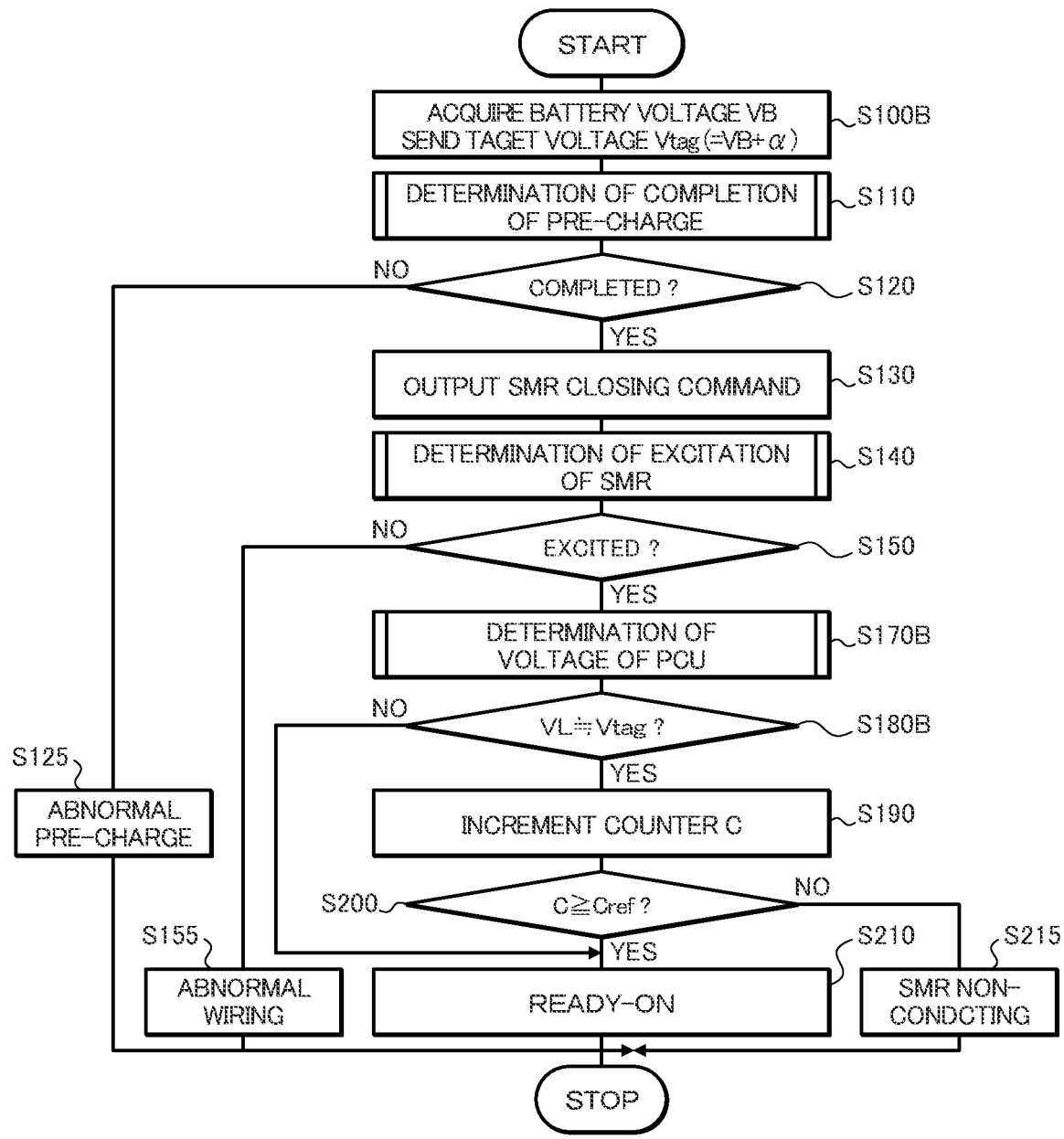
FIG. 4 is a flowchart showing one example of another routine performed by the controller of the power supply system of the present disclosure.
Figure 5:
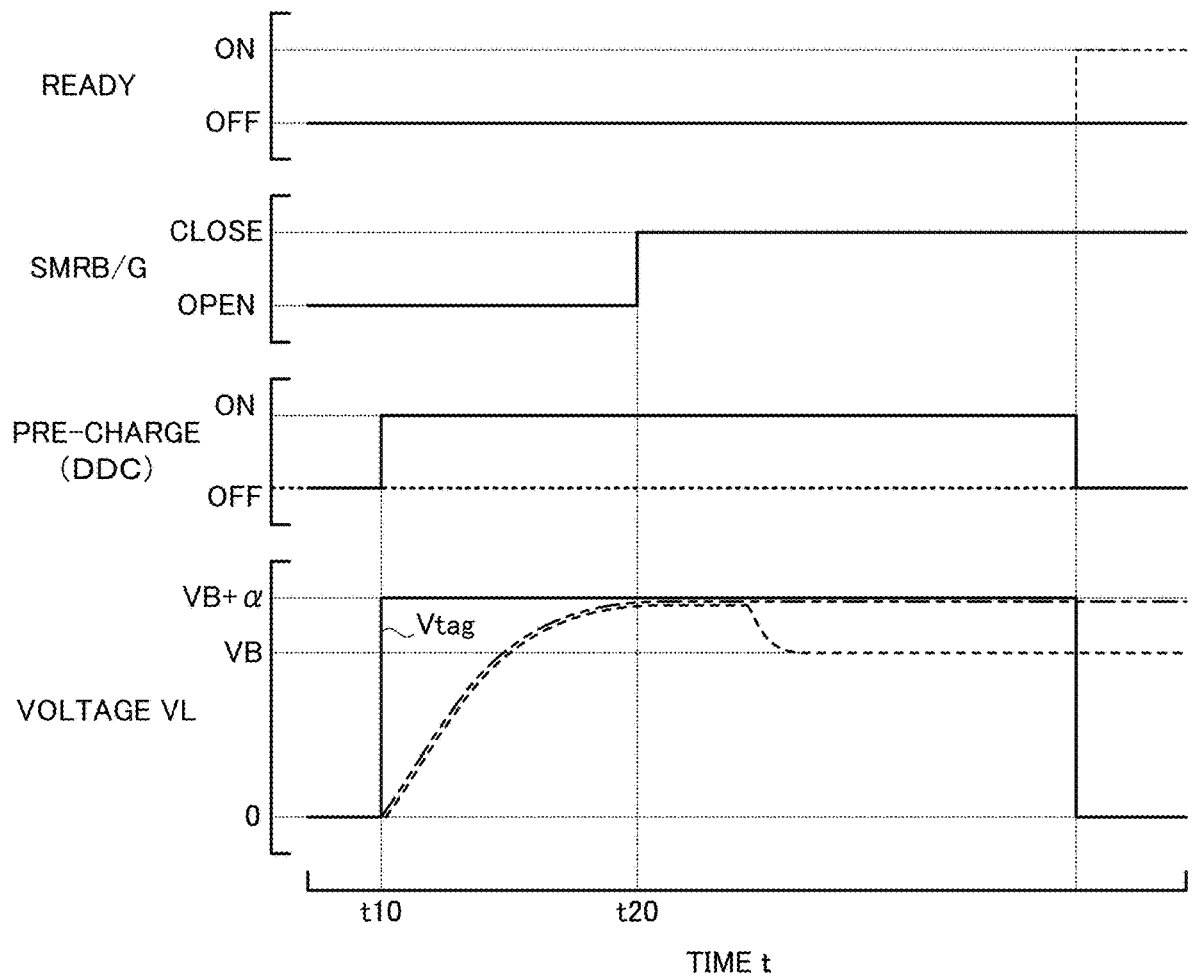
FIG. 5 is a time chart showing time changes in a target voltage for a pre-charge, a voltage of a capacitor of a power control device and the like when the routines of FIG. 4 is performed.

FIG. 4 is a flowchart showing another example of the routine executed by the HVECU 10 when the start switch SS is turned on and the system of the hybrid electric vehicle V is requested to be started. Further, FIG. 5 is a time chart illustrating time changes in the target voltage Vtag during execution of the routine of FIG. 4 and the terminal voltage VL of the filter capacitor 34 and the like of the PCU 3. The same processes as those of the routine shown in FIG. 2 are designated by the same reference numerals, and duplicate description will be omitted.

As shown in FIG. 4, when the start switch SS is turned on by the driver (time t10 in FIG. 5), the HVECU 10 (CPU) acquires the terminal voltage VB of the high voltage battery 2 detected by the voltage sensor 21 (step S100B). Further, in step S100B, the HVECU 10 sets a sum of the acquired terminal voltage VB and the predetermined value α (for example, about 5V) to the target voltage Vtag of the pre-charge and sends the set target voltage Vtag to the control circuit 55 of the bidirectional DC/DC converter 5. The control circuit 55 receives the target voltage Vtag from the HVECU 10 and controls the voltage conversion circuit 50 while the positive electrode side relay SMRB and the negative electrode side relay SMRG are opened, such that the detection value of the voltage sensor 51 becomes the target voltage Vtag. When the HVECU 10 determines that both coils of the positive-side relay SMRB and the negative-side relay SMRG are normally excited after executing the processes step S110-S140 (step S150: YES), the HVECU 10 acquires the terminal voltage VL of the filter capacitor 34 detected by the voltage sensor 36 without changing the target voltage Vtag and determines whether or not the terminal voltage VL becomes substantially the same as the target voltage Vtag (whether the terminal voltage VL fluctuates or not) (steps S170B, S180B).

That is, when the value (VB+α) different from the terminal voltage VB of the high voltage battery 2 is set the target voltage Vtag of the pre-charge in response to the system startup request via the start switch SS, and the positive electrode side relay SMRB and the negative electrode side relay SMRG are normally closed in response to the closing command by the HVECU 10 after the completion of the pre-charge (time t20 in FIG. 5), the terminal voltage VL of the filter capacitor 34 after the output of the closing command does not follow the target voltage Vtag and converges to the terminal voltage VB of the high voltage battery 2 as shown by a broken line in FIG. 5. On the other hand, when the value (VB+α) different from the terminal voltage VB of the high voltage battery 2 is set the target voltage Vtag in response to the system startup request, and at least one of the positive electrode side relay SMRB and the negative electrode side relay SMRG is not normally closed due to icing and the like even though the closing command is output by the HVECU 10 after the completion of the pre-charge, the terminal voltage VL of the filter capacitor 34 and the like after the output of the closing command follows the target voltage Vtag (=VB+α) that is different from the terminal voltage VB of the high voltage battery 2 and is substantially unchanged as shown by a two-dot chain line in FIG. 5.

Accordingly, when the routine of FIG. 4 is executed instead of the routine of FIG. 2, the power supply system 1 can accurately determine whether the positive electrode side relay SMRB and the negative electrode side relay SMRG are normally closed or not from the state of the voltage fluctuation of the filter capacitor 34 after the output of the closing command for the relay SMRB and SMRG. That is, the routine of FIG. 4 properly determines the status of the positive electrode side relay SMRB and the negative electrode side relay SMRG while properly pre-charging the filter capacitor 34 and the like of the PCU 3. Further, the process of step S170B in FIG. 4 may determine whether or not the state in which the absolute value |Vtag-VL| of the difference between the target voltage Vtag sent in step S100B and the terminal voltage VL of the filter capacitor 34 is equal to or less than a predetermined threshold value has continued for a predetermined time. Furthermore, the process of step S170B in FIG. 4 may determine that both the positive electrode side relay SMRB and the negative electrode side relay SMRG are normally closed when the state in which the absolute value |VB-VL| of the difference between the terminal voltage VB of the high voltage battery 2 and the terminal voltage VL of the filter capacitor 34 is equal to or less than a predetermined threshold value has continued for a predetermined time.

As has been described above, the power supply system (1) of the present disclosure includes a power storage device (2); the power control device (3) with the capacitor (34, 35) configured to be pre-charged with electric power from the power source (4) other than the power storage device (2); and the contact relay (SMRB, SMRG) configured to electrically connect the power storage device (2) and the power control device (3) and disconnect the connection between the power storage device (2) and the power control device (3). The power supply system (1) further includes the controller (10). The controller (10) is programmed to set the target voltage (Vtag) for the pre-charge of the capacitor (34, 35) in response to a system startup request (S100, S100B) and output the closing command for the contact relay (SMRB, SMRG) in response to a completion of the pre-charge (S130). The controller (10) is programmed to set the target voltage (Vtag) to the value different from a voltage (VB) of the power storage device (2) before or after then output of the closing command (S160, S100B) and determine the state of the contact relay (SMRB, SMRG) based on the voltage (VL) of the capacitor (34) after the output of the closing command (S170, S180, S170B, S180B).

The controller of power supply system of the present disclosure sets the target voltage for the pre-charge of the capacitor included in the power control device in response to the system startup request and outputs the closing command for the contact relay in response to the completion of the pre-charge so as to electrically connect the power storage device to the power control device. Further, the controller sets the target voltage to the value different from the voltage of the power storage device before or after the output of the closing command and determines the state of the contact relay based on the voltage of the capacitor after the output of the closing command. That is, when the contact relay is normally closed in response to the closing command after the completion of the pre-charge, the voltage of the capacitor after the output of the closing command becomes substantially the same as the voltage of the storage device, even if the target voltage of the pre-charge and the voltage of the storage device are different from each other. On the other hand, when the contact relay is not normally closed due to icing and the like even though the closing command is output after the pre-charge is completed, the voltage of the capacitor after the output of the closing command follows the target voltage that is different from the voltage of the power storage device. Accordingly, the power supply system of the present disclosure can accurately determine whether the relay is normally closed or not from a state of a voltage fluctuation of the capacitor after the output of the closing command for the contact relay, thereby properly determining the status of the contact relay included in the power supply system.

The controller (10) may be programmed to determine that the contact relay (SMRB, SMRG) is not normally closed and prohibit the power supply system (1) to operate when the voltage (VL) of the capacitor (34) follows the target voltage (Vtag) after the output of the closing command (S180: YES, S180B: YES). Further, the controller (10) may be programmed to determine that the contact relay (SMRB, SMRG) is normally closed and permit the power supply system (1) to operate when the voltage (VL) of the capacitor (34) does not follow the target voltage (Vtag) after the output of the closing command (S180: NO, S180B: NO).

When the relay is not normally closed due to the icing and the like, the power supply system is prohibited to operate. This suppresses the failure diagnosis function to misdiagnose that the power supply system fails.

The power control device (3) may be configured to drive the motor (MG1, MG2) mounted on the vehicle (V). The controller (10) may be programmed to prohibit the vehicle (V) to be shifted to the driving permission state when the controller (10) determines that the contact relay (SMRB, SMRG) is not normally closed after the output of the closing command (S180: YES, S180B: YES) and the number of times (C) determined that the contact relay (SMRB, SMRG) is not normally closed is less than the predetermined number (Cref) equal to or more than 2 (S200: NO). Further, the controller (10) may be programmed to shift the vehicle (V) to the driving permission state when the controller (10) determines that the contact relay (SMRB, SMRG) is normally closed (S180: NO, S180B: NO), and when the controller (10) determines that the contact relay (SMRB, SMRG) is not normally closed after the output of the closing command (S180: YES, S180B: YES) and the number of times (C) is equal to or more than the predetermined number (Cref) (S200: YES).

This enables the vehicle to be shifted into the driving permission state after breaking up and removing the ice that has formed in the relay by multiple closures of the relay even if the icing has occurred in the relay. In addition, when the number of times determined that the contact relay is not normally closed is equal to or more than the predetermined number, the vehicle can be shifted into the driving permission state so as to allow a fault diagnosis, thereby diagnosing causes of the relay not closing normally.

The controller (10) may be programmed to acquire the voltage (VB) of the power storage device (2) and set the acquired voltage (VB) to the target voltage (Vtag) in response to the system startup request (S100). Further, the controller (10) may be programmed to change the target voltage (Vtag) to the value (VB+α) different from the voltage (VB) of the power storage device (2) after the output of the closing command (S160) and determine whether the voltage (VL) of the capacitor (34) fluctuates following the changed target voltage (Vtag) (S170, S180).

This enables to properly determine the state of the relay while properly pre-charging the capacitor of the power control device.

The controller (10) may be programmed to acquire the voltage (VB) of the power storage device (2) and set the value (VB+α) different from the acquired voltage (VB) to the target voltage (Vtag) in response to the system startup request (S100B). Further, the controller (10) may be programmed to determine whether the voltage (VL) of the capacitor (34) fluctuates or not after the output of the closing command (S170B, S180B).

This power supply system also enables to properly determine the state of the relay while properly pre-charging the capacitor of the power control device.

The power source may include: the second power storage device (4) with a lower voltage than the power storage device (2); and the voltage converter (5) configured to drop electric power from the side of the power storage device (2) and the power control device (3) and supply the dropped electric power to the side of the second power storage device (4). The voltage converter (5) may be configured to boost electric power from the second power storage device (4) to the target voltage (Vtag) and pre-charge the capacitor (34, 35) by the boosted electric power in response to the system startup request. The power source for pre-charging the capacitor of the power control device is not limited to the second power storage device and the voltage converter. That is, the power source may be an external charging device.

The relay state determining method of the present disclosure is applied in the power supply system (1) including the power storage device (2); the power control device (3) that includes the capacitor (34, 35) configured to be pre-charged with electric power from a power source (4) other than the power storage device (2); and the contact relay (SMRB, SMRG) configured to electrically connect the power storage device (2) and the power control device (3) and disconnect the connection between the power storage device (2) and the power control device (3). The method includes: setting the target voltage (Vtag) for the pre-charge of the capacitor (34, 35) in response to the system startup request (S100, S100B) and outputting the closing command for the contact relay (SMRB, SMRG) in response to the completion of the pre-charge (S130); setting the target voltage (Vtag) to the value different from the voltage (VB) of the power storage device (2) before or after the output of the closing command (S160, S100B); and determining the state of the contact relay (SMRB, SMRG) based on the voltage (VL) of the capacitor (34, 35) after the output of the closing command (S170, S180, S170B, S180B).

This method enables to properly determining the status of the contact relay included in the power supply system.

The disclosure is not limited to the above embodiments in any sense but may be changed, altered or modified in various ways within the scope of extension of the disclosure. Additionally, the embodiments described above are only concrete examples of some aspect of the disclosure described in Summary and are not intended to limit the elements of the disclosure described in Summary.

INDUSTRIAL APPLICABILITY

The technique of the present disclosure is applicable to, for example, the manufacturing industry of the power supply system.

The invention claimed is:

1. A power supply system including a power storage device; a power control device with a capacitor configured to be pre-charged with electric power from a power source other than the power storage device; and a contact relay configured to electrically connect the power storage device and the power control device and disconnect a connection between the power storage device and the power control device, the power supply system comprising:
   a controller programmed to
      set a target voltage for a pre-charge of the capacitor from the power source in response to a system startup request and output a closing command for the contact relay in response to a completion of the pre-charge;
      set the target voltage for the pre-charge of the capacitor from the power source to a value different from a voltage of the power storage device before or after an output of the closing command and determine a state of the contact relay based on a voltage of the capacitor after the output of the closing command;
      acquire the voltage of the power storage device and set the acquired voltage to the target voltage in response to the system startup request;
      change the target voltage to the value different from the voltage of the power storage device after the output of the closing command and determine whether the voltage of the capacitor fluctuates following the changed target voltage;
      determine that the contact relay is not normally closed and prohibit the power supply system to operate when the voltage of the capacitor follows the target voltage after the output of the closing command; and
      determine that the contact relay is normally closed and permit the power supply system to operate when the voltage of the capacitor does not follow the target voltage after the output of the closing command.

2. The power supply system according to claim 1, wherein:
   the power control device is configured to drive a motor mounted on a vehicle;
   the controller is programmed to prohibit the vehicle to be shifted to a driving permission state when the controller determines that the contact relay is not normally closed after the output of the closing command and a number of times determined that the contact relay is not normally closed is less than a predetermined number equal to or more than 2; and the controller is programmed to shift the vehicle to the driving permission state when the controller determines that the contact relay is normally closed, and when the controller determines that the contact relay is not normally closed after the output of the closing command and the number of times is equal to or more than the predetermined number.

3. The power supply system according to claim 1, wherein the controller is programmed to acquire the voltage of the power storage device and set the value different from the acquired voltage to the target voltage in response to the system startup request, and wherein the controller is programmed to determine whether the voltage of the capacitor fluctuates or not after the output of the closing command.

4. The power supply system according to claim 1, wherein the power source includes: a second power storage device with a lower voltage than the power storage device; and a voltage converter configured to drop electric power from the side of the power storage device and the power control device and supply the dropped electric power to the side of the second power storage device, the voltage converter configured to boost electric power from the second power storage device to the target voltage and pre-charge the capacitor by the boosted electric power in response to the system startup request.

5. A relay state determining method in a power supply system including a power storage device; a power control device that includes a capacitor configured to be pre-charged with electric power from a power source other than the power storage device; and a contact relay configured to electrically connect the power storage device and the power control device, the method comprising:
  acquiring a voltage of the power storage device and setting the acquired voltage to a target voltage for a pre-charge of the capacitor from the power source in response to a system startup request;
  outputting a closing command for the contact relay in response to a completion of the pre-charge;
  changing the target voltage for the pre-charge of the capacitor from the power source to a value different from the voltage of the power storage device after an output of the closing command;
  determining whether a voltage of the capacitor fluctuates following the changed target voltage;
  determining that the contact relay is not normally closed and prohibit the power supply system to operate when the voltage of the capacitor follows the target voltage after the output of the closing command, and determining that the contact relay is normally closed and permit the power supply system to operate when the voltage of the capacitor does not follow the target voltage after the output of the closing command.

* * * * *